US008243409B2

(12) United States Patent
Koppmann et al.

(10) Patent No.: US 8,243,409 B2
(45) Date of Patent: Aug. 14, 2012

(54) PROTECTIVE DEVICE AND METHOD FOR ITS OPERATION

(75) Inventors: Bardo Koppmann, Kaltenbrunn (DE); Siegfried Neumann, Kümmersbruck (DE); Ludwig Niebler, Laaber (DE); Bernhard Streich, Amberg (DE); Alf Wabner, Amberg (DE); Norbert Zimmermann, Sulzbach-Rosenberg (DE)

(73) Assignee: Siemens Aktiengesellschaft, Munich (DE)

( * ) Notice: Subject to any disclaimer, the term of this patent is extended or adjusted under 35 U.S.C. 154(b) by 288 days.

(21) Appl. No.: 12/449,399

(22) PCT Filed: Feb. 7, 2007

(86) PCT No.: PCT/DE2007/000230

§ 371 (c)(1), (2), (4) Date: Aug. 6, 2009

(87) PCT Pub. No.: WO2008/095454

PCT Pub. Date: Aug. 14, 2008

(65) Prior Publication Data

US 2010/0002350 A1 Jan. 7, 2010

(51) Int. Cl.
*H02H 3/08* (2006.01)
*H02H 9/02* (2006.01)

(52) U.S. Cl. ...... 361/93.6; 361/93.8; 361/103; 361/105; 361/106

(58) Field of Classification Search ........................ None
See application file for complete search history.

(56) References Cited

U.S. PATENT DOCUMENTS

| | | | | |
|---|---|---|---|---|
| 4,249,068 | A * | 2/1981 | Mangan et al. | 219/497 |
| 6,452,767 | B1 | 9/2002 | Brooks | |
| 6,591,482 | B1 | 7/2003 | Fixemer | |
| 2006/0109009 | A1 | 5/2006 | Banke | |

FOREIGN PATENT DOCUMENTS

| | | | |
|---|---|---|---|
| DE | 19532197 | | 5/2000 |
| DE | 10253018 | A1 | 5/2004 |
| EP | 0762590 | A1 | 3/1997 |
| JP | 2001148312 | A | 5/2001 |
| WO | WO 2006015566 | A1 | 2/2006 |

* cited by examiner

*Primary Examiner* — Stephen W Jackson
*Assistant Examiner* — Terrence Willoughby
(74) *Attorney, Agent, or Firm* — Harness, Dickey & Pierce, P.L.C.

(57) ABSTRACT

A protective device is disclosed for combination with an electrical switching device including a main current line or for integration in such a switching device. In at least one embodiment, the protective device includes a switching element and a switching apparatus, which is provided for the actuation of the switching element and is influenced by a current flow through the main current line. In at least one embodiment, in order to influence the switching apparatus, a current transformer is integrated in the main current line and an electrical resistance of a secondary winding surrounded by the current transformer can be measured. A method for operating a protective device is also disclosed wherein the switching apparatus is triggered so as to actuate the switching element if the measured resistance reaches or exceeds a predetermined or predeterminable threshold value.

14 Claims, 1 Drawing Sheet

PROTECTIVE DEVICE AND METHOD FOR ITS OPERATION

PRIORITY STATEMENT

This application is the national phase under 35 U.S.C. §371 of PCT International Application No. PCT/DE2007/000230 which has an International filing date of Feb. 7, 2007, which designated the United States of America, the entire contents of each of which are hereby incorporated herein by reference.

FIELD

At least one embodiment of the invention generally relates to a protective device and/or to a method for operating such a protective device.

BACKGROUND

To protect electrical consumers against overloads a circuit supplying the electrical consumer or the electrical consumers must be able to be automatically interrupted. The interruption can be triggered in such cases for example on the basis of a heating-up associated with an overload, e.g. of a heating wire connected to the circuit, which enables circuit breakers with bimetal triggers to be used for example. Electronic solutions for overload protection are for example overload relays which typically comprise measurement transformers. These measurement transformers pass on to a processing unit a signal equivalent to the flow of current in a current path to be monitored; a heating up of the consumer is simulated on the basis of this signal. If the simulated temperature exceeds a prespecified or prespecifiable value, an interruption of the current flow in the current path is triggered.

DE 195 32 197 describes the use of a current transformer for protecting against overload which comprises at least one primary and at least one secondary winding coupled to said primary winding in a transformational arrangement. For simultaneous precise detection of the rated current and of an overload a load in the secondary branch can be switched over from a first resistance value to a second resistance value, which prevents saturation during overload.

DE 102 53 018 discloses a switching device with at least one current sensor for detecting the current flowing through at least one current path. The switching device can also comprise at least one additional temperature sensor which measures and reports a temperature increase which is associated with a slow increase in the current in the case of an overcurrent, in order to be able to detect in the event of an error whether an overcurrent or a short-circuit current is present.

SUMMARY

At least one embodiment of the invention specifies an especially suitable device for protecting against overload. In addition an especially suitable method for operating such protective device is also specified in at least one embodiment.

With the protective device of at least one embodiment which is intended for combination with an electrical switching device including a main current line or for integration into such as switching device and which comprises at least one switching element which can be embodied as an electrical or mechanical switching element as well as a switching facility provided for activation of the switching element influenced by a flow of current through the main current line, at least one current transformer is integrated into the main current line for influencing the switching facility. In this case the main current line can form a primary line of the current transformer. To influence the switching facility an electrical resistance or an electrical conductance of a least one secondary winding included in the current transformer is measurable.

In addition the influencing of the switching facility can also occur as a result of a current induced in the secondary winding. In this case a weighting can be provided in order to eliminate environmental effects for example. A use of the secondary winding of the current transformer for detecting the overload as well as for determining a temperature change, especially a temperature increase, allows a low-cost and space-saving realization of the protective device with simultaneous optimization of its function, i.e. protection of consumers and self-protection for example.

The term electrical switching device is used to refer here and below to a switching device for making possible an electrical current flow and/or interruption of the electrical current flow. In this case the switching element can be an electrical or mechanical switching element and for example be able to be actuated by means of at least one electrically magnetizable magnet drive or a mechanical breaker mechanism.

In this case, for operation of at least one embodiment of the inventive protective device, there is provision for the measurement of the resistance of the secondary winding to be undertaken for influencing the switching facility. The switching facility for actuating the switching element is triggered if the measured resistance or guide value reaches, exceeds or falls below a predetermined or predeterminable threshold value. The threshold value in such cases is adapted or able to be adapted to the switching device or to a consumer.

In such cases, at least one embodiment of the invention is based on the knowledge that the resistance and electrical conductance of a material change as its temperature changes and thus a change as such can be interpreted as a temperature change or the temperature/the temperature change can be determined.

In the event of an overload which leads to a temperature increase, a flow of current through the main current line is to be interrupted by the switching facility in order to avoid any damage which might otherwise occur.

With a transformer, e.g. measurement transformer, which is located in the vicinity of the main current line, the temperature of its secondary winding changes for example as a function of the flow of current through the main current line. In addition or as an alternative a temperature change of the secondary winding can also occur with a general temperature change in the environment. If the resistance is now determined for example in the secondary winding of the transformer, e.g. measured, then on the basis of the measurement value or on the basis of the temperature or temperature change determined from said value, the current flow can be interrupted.

In an example embodiment, the resistance is measured at predetermined or predeterminable points in time, especially in accordance with a predetermined or predeterminable measurement cycle. Alternately the resistance can be measured continuously. This makes possible an ongoing monitoring of the resistance and thus of the temperature.

Preferably the switching element is arranged in a control circuit including the switching device and, on interruption of the control circuit by actuating the switching element, an interruption of the current flow through the main current line is effected.

In an alternate embodiment the switching element is arranged as a trigger of a switching mechanism of the switching device, e.g. a so-called breaker mechanism, and actuation of the switching element brings about a triggering of the switching mechanism and an interruption of the current flow through the main current line.

An advantage of at least one embodiment of the invention is thus especially that an overload protection can be guaranteed in a simple and low-cost manner, namely by way of a resistance measurement in the secondary winding of the current transformer assigned to the protective device. In addition there can be a combination of the protective and/or switching device with further apparatus, e.g. at least one additional second switching facility for detection of and protection from short-circuits.

The example embodiments are not to be understood as restricting the invention. Instead numerous variations and modifications are possible within the framework of the current disclosure, especially such variants, elements and combinations and/or materials which example by combination or variation of individual features or elements or method steps described in conjunction with the general description and forms of embodiment as well as described in the claims and contained in the drawings are able to be derived by the person skilled in the art in respect of achieving the object and which lead by combinable features to a new object or to new method steps or sequences of method steps.

BRIEF DESCRIPTION OF THE DRAWINGS

An example embodiment of the invention is described below in greater detail on the basis of the drawing. Objects or elements which correspond to each other are labeled with the same reference numbers in all figures.

The figures show

DETAILED DESCRIPTION OF THE EXAMPLE EMBODIMENTS

Figure 1:
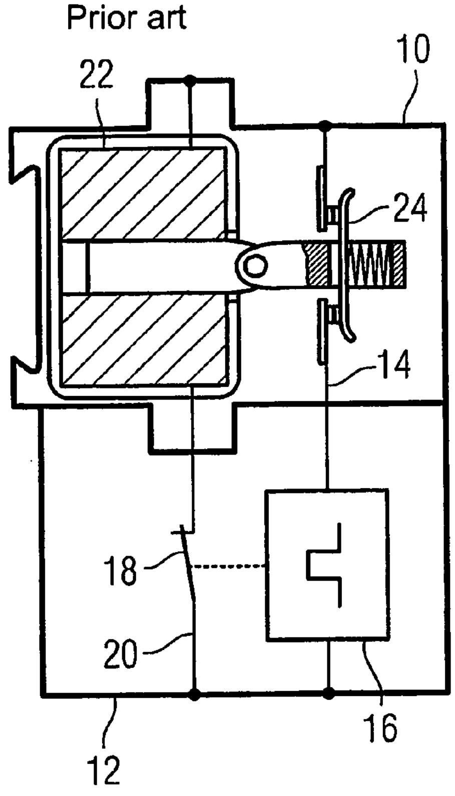
FIG 1 Prior art
FIG. 1 shows an electrical switching device combined with a protective device.

FIG. 1 shows what is referred to as a contactor as an example of an electrical switching device 10 which is dealt with by the invention. Combined with this is a protective device 12. The electrical switching device 10 is provided for switching a main current line 14. The main current line 14 and a primary current circuit formed with it also extends into the protective device 12. Provided in the area of the protective device 12 is a switching facility 16 in the area of the main current line 14 for detection of overcurrent in the main current line 14. The switching facility 16 acts on a switching element 18 which is arranged in a control circuit 20 including the protective device 12 and the electrical switching device 10. On the electrical switching device 10 side a magnetic drive 22 is to be found in the control circuit 20. By means of the magnetic drive 22, on the interruption of the control circuit 20, the primary circuit can be interrupted by a switching contact 24 on the electric switching device 10 side located in the primary circuit being opened as a result of actuation by the magnetic drive 22.

Figure 2:
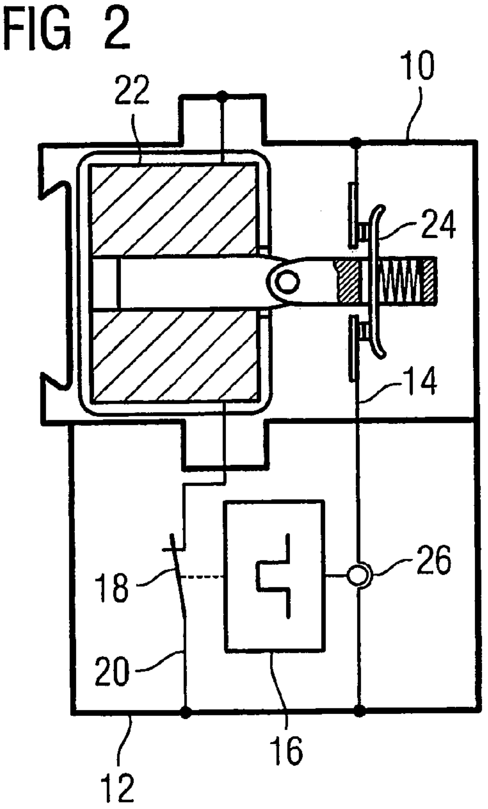
FIG. 2 shows a protective device combined with the electrical switching device.

FIG. 2 shows an embodiment of the protective device 12 in accordance with an embodiment of the invention. This makes provision for a current transformer 26 to be integrated into the main current line 14. In this case the main current line 14 can form a primary line of the current transformer 26. The switching facility 16 is influenced by the current transformer 26 so that if necessary there is a resulting actuation of the switching element 18 and thereby an opening of the switching contact 24. To enable the switching facility 16 to be influenced by the current transformer 26 there is provision for the switching facility 16 to measure the electrical resistance or the electrical conductance of a secondary winding included in the current transformer 26. The electrical resistance or the electrical conductance of the secondary winding is dependent on its temperature which in its turn is dependent on a flow of current in the secondary winding as well as, as a result of the proximity of secondary winding and main current line, on the temperature of the main current line 14. The current flow in the secondary winding and the temperature of the main current line 14 in their turn are dependent on the current flow in the main current line 14, so that the resistance or the conductance of the secondary winding is a measure of the current flow in the main current line 14.

If the measured resistance or the measured conductance reaches a predetermined or predeterminable threshold value or exceeds or falls below it, the switching facility 16 of the switching element 18 is triggered. The resistance can in this case be measured continuously or at predetermined or predeterminable intervals, especially in accordance with a predetermined or predeterminable measurement cycle. Measuring the resistance in accordance with the measurement cycle in this case has the advantage that temperature changes in the secondary winding are reduced to a minimum as a result of the measurement.

Figure 3:
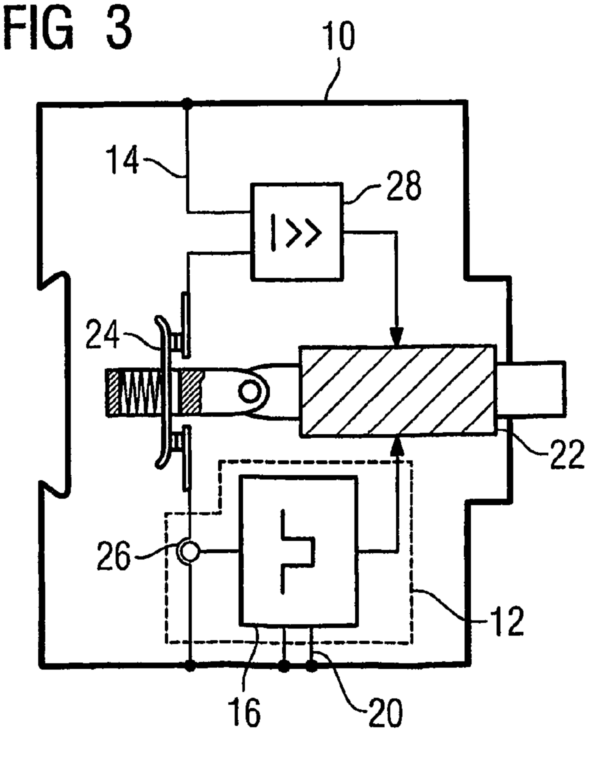
FIG. 3 shows a protective device integrated into the electrical switching device.

FIG. 3 shows an embodiment of the invention in which the protective device 12 is integrated into the electrical switching device 10. A power switch is shown in this figure as an example of an electrical switching device 10. By contrast with the contactor shown in FIG. 2, a switching mechanism 28, e.g. a so-called breaker mechanism, is triggered by the switching facility 16 via a trigger not shown in the diagram functioning as a switching element 18, which opens the switching contact. Not shown in FIG. 3 is the fact that a short-circuit circuit-breaker is integrated into the main current line 14, which is also intended for triggering the switching mechanism 28.

At least one embodiment of the invention can thus be briefly summarized as follows:

A protective device 12 is specified for combination with an electrical switching device 10 comprising a main current line 14 or for integration into such a switching device 10, with a switching element 18 and a switching facility intended for its actuation influenced by a flow of current through the main current line 14, whereby, for influencing the switching facility 16, a current transformer 26 is integrated into the main current line 14 and an electrical resistance of a secondary winding included in the current transformer 26 is measurable, as well as a method for operating an inventive protective device 12, with the switching facility being triggered for actuating the switching element if the measured resistance reaches or exceeds a predetermined or predeterminable threshold value.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A protective device for combination with an electrical switching device including a main current line or for integration into the electrical switching device, the protective device comprising:

a switching element configured to actuate contacts in the switching device;

a switching facility, to actuate the switching element and influenceable by a flow of current through the main current line;

a current transformer configured to detect a current overload integrated into the main current line to influence the switching facility, wherein the switching facility is further configured to determine a temperature of the main current line based on a temperature induced in a secondary winding included in the current transformer, the temperature being determinable based upon a resistance of the secondary winding caused by the induced temperature, and wherein the switching facility actuates the switching element upon detection of a current overload in the main line.

2. The protective device as claimed in claim 1, wherein the switching element is arranged in a control circuit including the switching device, an interruption of the control circuit, by actuation of the switching element, being adapted to an interruption of the current flow through the main current line.

3. The protective device as claimed in claim 1, wherein the switching element is assigned a switching mechanism of the switching device as a trigger and wherein an actuation of the switching element is adapted to cause a triggering of the switching mechanism and an interruption of the flow of current through the main current line.

4. The protective device as claimed in claim 1, wherein the protective device is configured to protect an electrical consumer.

5. A method for operating a protective device, either in combination with an electrical switching device including a main current line or integrated into the electrical switching device, the protective device including a switching element and a switching facility, to actuate the switching element, influenceable by a flow of current through the main current line, wherein a current transformer configured to detect a current overload is integrated into the main current line to influence the switching facility, wherein the switching facility is further configured to determine a temperature of the main current line based on a temperature induced in a secondary winding included in the current transformer, the temperature being determinable based upon a resistance of the secondary winding caused by the induced temperature, and wherein the switching facility actuates the switching element upon detection of a current overload in the main line, the method comprising:

determining the temperature of the main current line;

detecting a current overload;

triggering the switching facility for actuation of the switching element upon detection of a current overload in the main line.

6. The method as claimed in claim 5, wherein the resistance is measured at least one of continuously and at known intervals.

7. The method as claimed in claim 6, wherein the resistance is measured at known intervals in accordance with a measurement cycle.

8. The method as claimed in claim 7, wherein the threshold value is at least one of predetermined and predeterminable.

9. The method as claimed in claim 6, wherein the switching element is arranged in a control circuit including the switching device and wherein an interruption of the control circuit, by actuation of the switching element, causes an interruption of the current flow through the main current line.

10. The method as claimed in claim 6, wherein the switching element is assigned a switching mechanism of the switching device as a trigger and wherein an actuation of the switching element causes a triggering of the switching mechanism and an interruption of the flow of current through the main current line.

11. The method as claimed in claim 5, wherein the switching element is arranged in a control circuit including the switching device and wherein an interruption of the control circuit, by actuation of the switching element, causes an interruption of the current flow through the main current line.

12. The method as claimed in claim 5, wherein the switching element is assigned a switching mechanism of the switching device as a trigger and wherein an actuation of the switching element causes a triggering of the switching mechanism and an interruption of the flow of current through the main current line.

13. The method as claimed in claim 5, wherein the threshold value is at least one of predetermined and predeterminable.

14. The method as claimed in claim 5, wherein triggering the switching facility protects an electrical consumer.

* * * * *